Patented Dec. 2, 1930

1,783,925

UNITED STATES PATENT OFFICE

HARRY C. MOUGEY, OF DETROIT, MICHIGAN, ASSIGNOR TO GENERAL MOTORS RESEARCH CORPORATION, OF DETROIT, MICHIGAN, A CORPORATION OF DELAWARE

SOLDERING FLUX

No Drawing.    Application filed August 19, 1929. Serial No. 387,089.

The invention relates to compositions of the type employed as fluxes for soldering operations and has for its principal object the provision of a composition of this type adapted to act quickly and uniformly upon metal surfaces particularly in the presence of oil or grease.

It is customary to apply to metal surfaces to be soldered a flux containing cleaning and fluxing substances such as borax, zinc chloride and ammonium chloride with or without the addition of hydrochloric acid. Oily materials are often present on the surfaces to which the solder is to be applied and, in such cases, fluxes in paste or liquid form in which water alone is employed as a solvent are not entirely satisfactory for the reason that they do not wet the oily surface and therefore do not attack or clean the surface.

In accordance with the present invention it is proposed to employ as an ingredient of the flux a material which is a powerful solvent for oils and is also a common solvent for both oil and water or, in other words, is miscible with or soluble in both oil and water, and is therefore capable of being used in aqueous solution and in treatment of surfaces in the presence of both oil and water.

It is desirable also that the material selected shall not be too readily volatile, shall not give off noxious fumes or be otherwise objectionable to workmen and that it shall not have an undesirable corrosive action upon the steel or other surfaces to which it is applied. It is preferable, although not always necessary, that the material shall have a boiling point not lower than that of water.

From the standpoint of the properties referred to and also of commercial availability I have found certain of the glycols and their ethers and esters especially suitable for use as the oil solvent. Particular mention may be made of (1) the polyglycols, such as di-, tri-, and tetra-ethylene glycol, and their ethers, especially the ethyl and butyl carbitols (ethyl and butyl ethers of di-ethylene glycol), (2) the methyl, ethyl and propyl ethers of either ethylene glycol or propylene glycol, also some other glycol ethers, as 1,4-dioxan, (3) the acetates of glycol and di-ethylene glycol and of some of the glycol ethers. Of the acetates, the preferred examples are ethylene glycol mono-acetate, di-ethylene glycol mono-acetate and the acetates of the methyl and ethyl ethers of ethylene glycol.

All of the above may be grouped as water soluble oil solvents of the glycol type and will be hereinafter so designated. By the use of the terms "oil soluble" and "water soluble" it is not intended to limit the invention to those substances which are miscible in all proportions with oil and water. The substance is deemed water soluble for the purposes of this invention if it is sufficiently soluble in water to form a solution in the concentration in which it is desired to use the material. Similarly it is "oil soluble" if it is capable of attacking oil sufficiently to cause the mixture to wet the oily surface to which it is to be applied.

Some other esters which are both water soluble and oil soluble are also suitable for use in soldering fluxes in view of their powerful solvent action and other desirable properties and their present availability on the market. Among these may be mentioned ethyl lactate and ethyl oxybutyrate. Diacetone alcohol, $CH_3COCH_2COH(CH_3)_2$, is another material possessing to a high degree the properties rendering it desirable for this use.

A soldering flux which will be of a pasty consistency may be made by mixing about ten parts (by weight) of zinc chloride with about five parts of one of the oil solvents mentioned above.

If a liquid flux is desired, the above composition may be diluted with ethyl alcohol or with water or both. For example, with about 10 parts of zinc chloride I may mix about four parts ethyl alcohol and 1–2 parts of the oil solvent, and to the composition may be added for further dilution about five parts of water. A small proportion of sal-ammoniac may be added to the composition if desired, particularly for use in soldering at low temperatures.

Where the surface to be soldered is rusty or badly oxidized it may be desirable to add to the composition a small amount of a cleaning acid, for example, hydrochloric acid.

I claim:

A soldering flux comprising zinc chloride, water and a water-soluble oil solvent of the group consisting of di-, tri- and tetra-ethylene glycol, ethyl and butyl carbitol, the mono-acetates of ethylene and di-ethylene glycol and of the methyl and ethyl ethers of ethylene glycol, ethyl lactate, ethyl oxybutyrate and di-acetone alcohol.

In testimony whereof I affix my signature.

HARRY C. MOUGEY.